ывай

United States Patent
Stevens et al.

(10) Patent No.: US 7,885,888 B2
(45) Date of Patent: Feb. 8, 2011

(54) AUCTION FOR FINANCIALLY SETTLED CONTRACTS

(75) Inventors: Andrew J. Stevens, Bethesda, MD (US); Matthew R. Tate, Bethesda, MD (US); Mark A. Bulkeley, Great Falls, VA (US); Dean L. Wilde, II, McLean, VA (US)

(73) Assignee: DC Energy LLC, Vienna, VA (US)

( * ) Notice: Subject to any disclaimer, the term of this patent is extended or adjusted under 35 U.S.C. 154(b) by 0 days.

(21) Appl. No.: 12/692,207

(22) Filed: Jan. 22, 2010

(65) Prior Publication Data

US 2010/0121760 A1 May 13, 2010

Related U.S. Application Data

(63) Continuation of application No. 11/986,091, filed on Nov. 20, 2007, now Pat. No. 7,676,424.

(51) Int. Cl.
 G06Q 40/00 (2006.01)
(52) U.S. Cl. .......................................... 705/37
(58) Field of Classification Search ..................... 705/37
 See application file for complete search history.

(56) References Cited

U.S. PATENT DOCUMENTS

| | | | |
|---|---|---|---|
| 5,803,500 A * | 9/1998 | Mossberg | 283/67 |
| 6,115,698 A * | 9/2000 | Tuck et al. | 705/37 |
| 6,321,212 B1 | 11/2001 | Lange | |
| 6,377,940 B2 | 4/2002 | Tilfors et al. | |
| 6,405,180 B2 * | 6/2002 | Tilfors et al. | 705/36 R |
| 6,421,653 B1 | 7/2002 | May | |
| 6,618,707 B1 | 9/2003 | Gary | |
| 6,751,597 B1 | 6/2004 | Brodsky et al. | |
| 6,775,597 B1 | 8/2004 | Ristanovic et al. | |
| 6,909,941 B2 | 6/2005 | Scott et al. | |
| 7,039,610 B2 | 5/2006 | Morano et al. | |
| 7,085,739 B1 | 8/2006 | Winter et al. | |
| 7,124,106 B1 | 10/2006 | Stallaert et al. | |

(Continued)

OTHER PUBLICATIONS

Saavedra, Osvaldo R. and Unsihuay, Clodomiro. Comparative Studies on Transmission Loss Allocation Methods for Competitive Electricity Markets. 2003 IEEE Bologna PowerTech Conference. (Jun. 23-26, 2003. Bologna, Italy).*

(Continued)

*Primary Examiner*—Alexander Kalinowski
*Assistant Examiner*—John O Preston
(74) *Attorney, Agent, or Firm*—Stephen C. Glazier; K&L Gates LLP

(57) ABSTRACT

Various embodiments show a system for conducting an auction for a plurality of financially settled contracts: The system may comprise at least one processor. The at least one processor may be programmed to receive a plurality of first participant bids from a first participant and a plurality of second participant bids from a second participant. The at least one processor may also be programmed to match a batch of bids to create a plurality of awarded bids. The contracts may include, for example, an oil contract, a coal contract, a natural gas contract, an electricity contract, a weather contract, a weather-related events contract, a commodities contract, location specific service contracts (e.g., passenger contract and/or freight contracts).

59 Claims, 5 Drawing Sheets

U.S. PATENT DOCUMENTS

| | | | |
|---|---|---|---|
| 7,162,447 | B1 | 1/2007 | Cushing |
| 7,243,083 | B2 | 7/2007 | Burns |
| 7,246,093 | B1 | 7/2007 | Katz |
| 7,359,878 | B2 | 4/2008 | Peljto et al. |
| 7,634,442 | B2 | 12/2009 | Alvarado et al. |
| 7,676,424 | B2 | 3/2010 | Stevens et al. |
| 7,702,563 | B2 | 4/2010 | Balson et al. |
| 2002/0055901 | A1* | 5/2002 | Gianakouros et al. ......... 705/37 |
| 2003/0004852 | A1* | 1/2003 | Burns .......................... 705/37 |
| 2003/0028476 | A1* | 2/2003 | Jenkins et al. ................ 705/37 |
| 2003/0041002 | A1 | 2/2003 | Hao et al. |
| 2003/0101123 | A1* | 5/2003 | Alvarado et al. .............. 705/36 |
| 2005/0273341 | A1* | 12/2005 | Hoffesommer ................ 705/1 |

OTHER PUBLICATIONS

Natural Gas Week. Exchanges OK Deal on Contracts; Could Hasten Open Outcry Demise. New York: Apr. 7, 2006. p. 1.*

Middle East Company News. First Energy Contract Starts Trading on DGCX today. Dubai: Oct. 30, 2006. p. 1.*

Xinhua News Agency—CEIA. Online Energy Trading Expected to Swell, Says Report. Woodside: Apr. 10, 2001. p. 1.*

Bushnell, James, "Transmission Rights and Market Power," Apr. 1999, University of California Energy Institute, 15 pages.

Notice of Allowance dated Jul. 23, 2010 in U.S. Appl. No. 12/396,926.

Office Action dated Jun. 21, 2010 in U.S. Appl. No. 12/542,151.

"About ISE Alternative Markets," International Securities Exchange, printed from http://www.ise.com/WebForm/viewPage.aspx?categoryId=112&header2=true&menu0=true on Oct. 30, 2007.

"Longitude Technology," International Securities Exchange, printed from http://www.ise.com/WebForm/viewPage.aspx?categoryId=341&header2=true&menu1=true on Oct. 30, 2007.

"Longitude Mathematics," International Securities Exchange, printed from http://www.ise.com/WebForm/viewPage.aspx?categoryId=342&header2=true&menu2=true on Oct. 30, 2007.

"The Mathematical Principles of Longitude," International Securities Exchange, printed from http://www.ise.com/WebForm/viewPage.aspx?categoryId=342&header2=true&menu2=true on Oct. 30, 2007.

Bushnell, James, "Transmission Rights and Market Power," Discussion draft, Oct. 1998, downloaded from: http://faculty-gsb.stanford.edu/wilson/archive/E542/classfiles/trans_rights2.pdf on Nov. 20, 2007.

Liu, Leslie & Zobian, Assef, "The Importance of Marginal Loss Pricing in an RTO Environment" downloaded from http://www.ces-us.com/download/Losses%20paper%20-%20web.pdf on Nov. 20, 2007.

Clodomiro Unsihuay and Osvaldo R. Saavedra, "Comparative Studies on Transmission Loss Allocation Methods for Competitive Electricity Markets," 2003 IEEE Bologna PowerTech Conference, Jun. 23-26, 2003, Bologna, Italy, 7 pages.

Exchanges OK Deal on Contracts, Could Hasten Open Outcry Demise, Natural Gas Week, New York, Apr. 7, 2006, 2 pages.

1st Energy Contract Starts Trading on DGCX Today, Middle East Company News, Dubai, Oct. 30, 2006, 2 pages.

Online Energy Trading Expected to Swell, Says Report, Xinhua News Agency—CEIS, Woodside, Apr. 10, 2001, 2 pages.

Office Action dated Sep. 3, 2008 in U.S. Appl. No. 11/986,091.

Office Action dated Mar. 23, 2009 in U.S. Appl. No. 11/986,091.

Notice of Allowance dated Nov. 17, 2009 in U.S. Appl. No. 11/986,091.

Office Action dated Oct. 27, 2009 in U.S. Appl. No. 12/396,926.

U.S. Appl. No. 12/479,432, filed Jun. 5, 2009.

U.S. Appl. No. 12/542,151, filed Aug. 17, 2009.

U.S. Appl. No. 12/396,926, filed Mar. 3, 2009.

* cited by examiner

AUCTION FOR FINANCIALLY SETTLED CONTRACTS

CROSS REFERENCE

The present patent application is a continuation of U.S. patent application Ser. No. 11/986,091, filed Nov. 20, 2007 now U.S. Pat. No. 7,676,424.

FIELD OF THE INVENTION

Embodiments of the invention generally relate to methods and systems for facilitating, performing and/or participating in auctions of financially settled contracts.

BACKGROUND

The present disclosure relates to auctions for financially settled contracts. Financially settled contracts are traded over-the-counter and on various exchanges including, for example, some forward commodities exchanges. Participants trade financially settled contracts outright and may also trade spreads and strips of financially settled contracts. A spread includes a short position in a first contract and a long position in a second contract, equating to a position that settles on a difference in price between the two contracts. A strip includes like positions (e.g., long or short) in two contracts over consecutive settlement periods. Advancements are needed in the trading of financially settled contracts to improve liquidity, volume and other factors.

FIGURES

Embodiments of the present invention are described herein, by way of example, in conjunction with the following figures, wherein.

DESCRIPTION

In one general aspect, embodiments of the present invention may be directed to a system for conducting an auction for a plurality of financially settled contracts. The system may comprise at least one processor. The at least one processor may be programmed to receive a plurality of first participant bids from a first participant and a plurality of second participant bids from a second participant. The at least one processor may also be programmed to match a batch of bids to create a plurality of awarded bids. The batch of bids may comprise the plurality of first participant bids and the plurality of second participant bids. Each bid of the batch of bids may relate to at least a portion of the plurality of financially settled contracts. Also, the matching may comprise matching an outright bid with at least one leg of at least one non-outright bid.

In another general aspect, embodiments of the present invention may be directed to a system for conducting an auction for a plurality of financially settled forward electricity contracts corresponding to a first spot market. The system may comprise at least one processor. The at least one processor may be programmed to receive a plurality of first participant bids from a first participant and a plurality of second participant bids from a second participant. The at least one processor may also be programmed to match a batch of bids to create a plurality of awarded bids. The batch of bids may comprise the plurality of first participant bids and the plurality of second participant bids. Also, each bid of the batch of bids may relate to at least a portion of the plurality of financially settled contracts. In addition, the matching may comprise matching an outright bid with at least one leg of at least one non-outright bid. The plurality of financially settled forward electricity contracts may comprise a plurality of nodal contracts.

Figure 1:
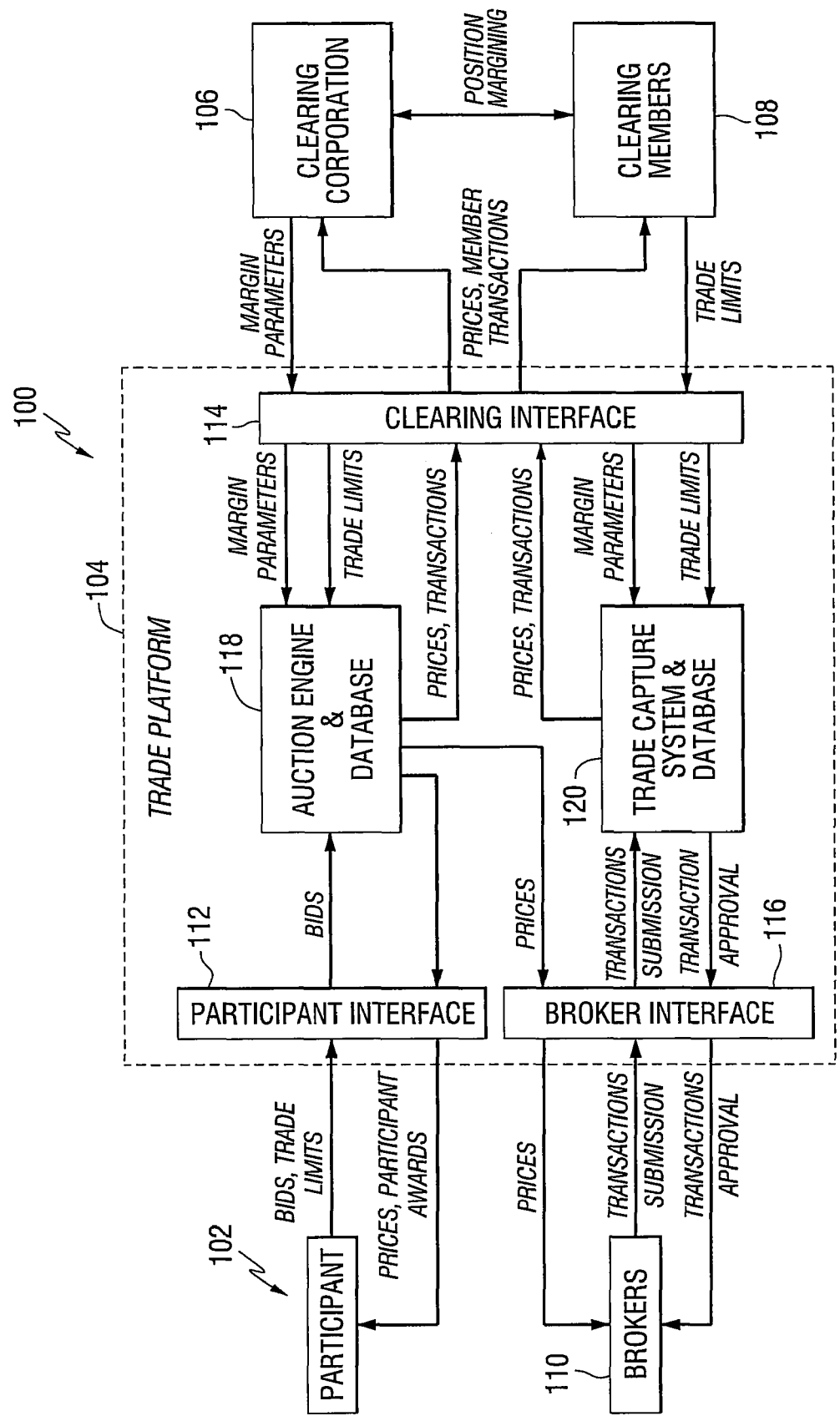
FIG. 1 illustrates one embodiment of an auction architecture for facilitating auctions in financially settled contracts.

FIG. 1 illustrates one embodiment of an auction architecture 100 for facilitating auctions in financially settled contracts. The financially settled contracts may include, for example, contracts that settle on the price of an underlying value, such as a commodity, security, index, or other value over a specified settlement period. The auction architecture 100 may comprise a trade platform 104 configured to conduct the auctions. The trade platform 104 may include an auction engine 118 for conducting various auctions by matching bids, for example, as described below. Optionally, the trade platform 104 may also be configured to work in conjunction with brokers 110. For example, the trade platform 104 may comprise a trade capture system 120 to aid in the execution of broker-facilitated trades. Broker-facilitated trades may allow trade platform participants 102 to make and fill bids outside of the auction process. This may be useful, for example, for participants 102 who wish to trade a position in between auctions, or for participants 102 whose bids in an auction were not awarded.

The trade platform 104 may be in communication with various other parties. For example, the one or more participants 102 may submit auction bids, auction constraints, broker bids, etc., to the trade platform 104. Participants 102 may also receive positions awarded as a result of the auctions or broker transactions. A clearing corporation 106 or other clearing party may provide additional auction constraints and may clear awarded bids generated by the trade platform 104 in the various auctions as well as awarded bids cleared in broker transactions. Clearing members 108 for the participants 102 may handle various matters related to the clearing of winning bid pairs and may also provide auction constraints.

The trade platform 104 may also include various interfaces 112, 114, 116 for facilitating communication with other parties of the architecture 100. For example, a participant interface 112 may handle communications with the various participants 102. A broker interface 116 may handle communications with the various brokers 110. Also, a clearing interface 114 may handle communications with the clearing corporation 106 and clearing members 108. The various components 112, 114, 116, 118, 120 of the platform 104 may be implemented according to any suitable hardware and/or software methods. For example, the components 112, 114, 116, 118, 120 may comprise various software modules executed by the processor or processors of one or more servers or other computing devices.

The trade platform 104 may be configured to handle bids and auctions for any kind of financially settled contracts. According to various embodiments, however, the trade platform 104 may be configured to support auctions for contracts that settle on locationally depending underlying values, such as some energy-related contracts. For example, locational energy-related contracts may include oil contracts; coal contracts; natural gas contracts; and electricity contracts; weather contracts; weather-related events contracts; location-specific services contracts (e.g., passenger contracts; freight contracts), etc. Also, according to various embodiments, the trade platform 104 may be configured to support auctions that include other commodities (e.g., agricultural commodities, raw materials, etc.) and events or properties that may affect the prices of the other commodities.

Figure 2:
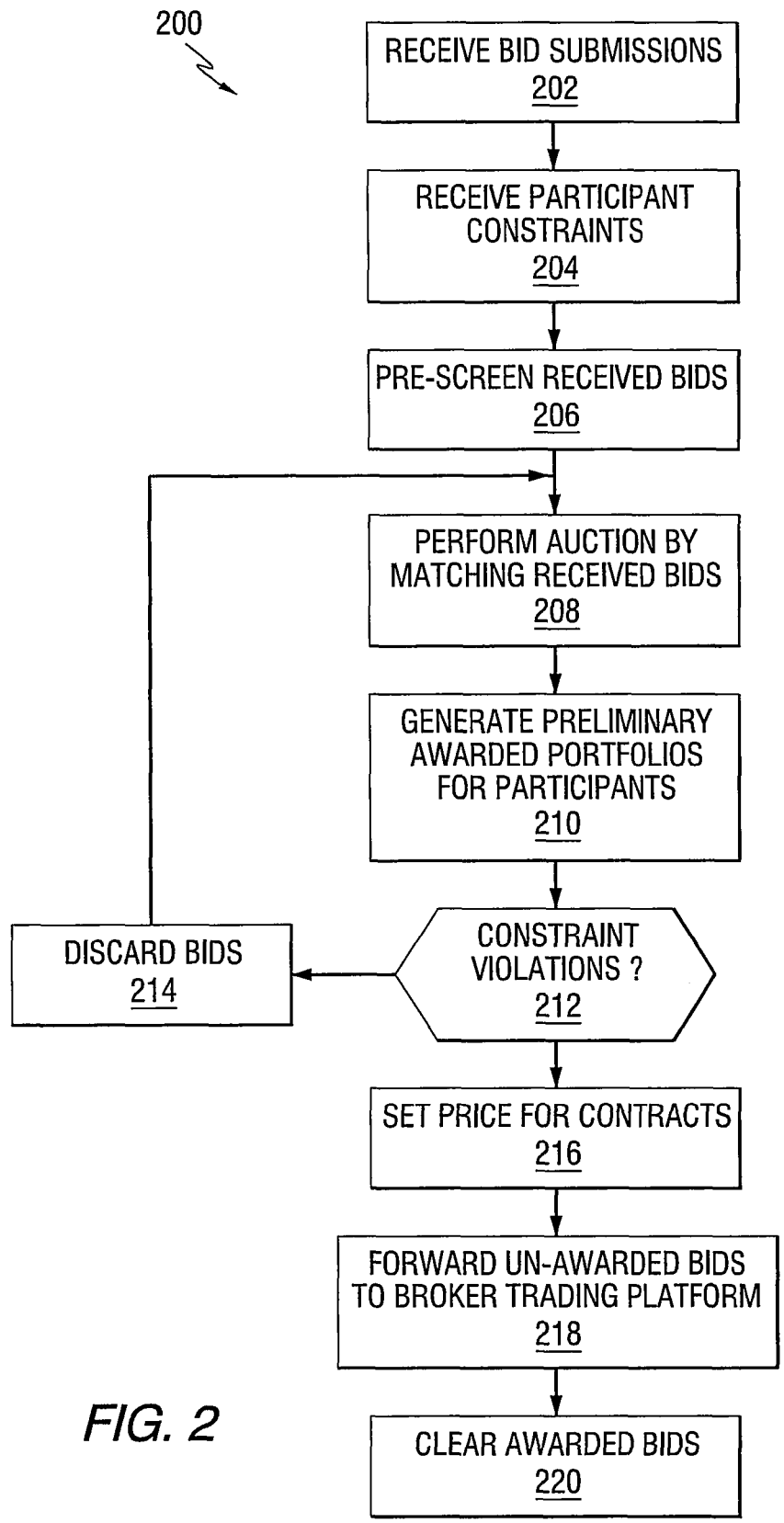
FIG. 2 illustrates one embodiment of a process flow for implementing an auction of financially settled contracts utilizing the architecture shown in FIG. 1.

FIG. 2 illustrates one embodiment of a process flow 200 for implementing an auction for financially settled contracts, for example, utilizing the architecture 100 shown in FIG. 1. At box 202, the trade platform 104 may receive bid submissions from participants 102 for an auction. Bid submissions for any given auction may be received over a predetermined bid submission period, (e.g., one day prior to the auction, one week prior to the auction, etc.). Each bid submission may comprise one or more bids for positions on financially settled contracts to be considered in the auction. Participants 102 may submit all of their bids for the auction at the same time, or may make multiple submissions. When a participant 102 submits more than one bid, the participant may have the option to prioritize their bids. The auction engine 118 may utilize the priorities, as described below, if it becomes necessary to discard one or more bids. The set of all bids submitted for a given auction may be referred to as a batch.

Bids may include outright bids for a contract and/or non-outright bids. An outright bid may be a bid for a position having a one-to-one correlation with a contract. An outright bid may comprise an indication of a contract (e.g., a commodity code, location code and settlement period), a quantity, a price, a commodity type, and an indication of whether the bid is for a long or short position on the contract. A non-outright bid may be a bid for a position that does not have a one-to-one correlation to a contract. For example, some non-outright bids may have multiple legs, where each leg represents a position (e.g., long or short) in a particular contract. Some non-outright bids may include one or more legs representing a single position that is less than all of a contract (e.g., over a smaller period than the tenor of the contract). Spread bids and strip bids may be non-outright bids. Accordingly, a non-outright bid may comprise an indication of each contract corresponding to a leg of the non-outright bid. The indication may include, for example, quantity, price, settlement period, and contract code, as well as an indication of which leg or legs are short and which leg or legs are long. According to various embodiments, non-outright bids may be permitted to include any combination of long and short legs.

The trade platform 104 may be configured to support outright and non-outright bids across an arbitrary number of dimensions. For example, non-outright bids may include any combination of legs for positions in contracts settling on any combination or combinations of underlying values, quantities and/or settlement periods. One example non-outright bid may comprise a long position on a contract for a first underlying (e.g., the price of a commodity at a first location) settling over a first time period and a short position on a contract for a second underlying (e.g., the price of the same or a different commodity at a second location) settling over a second time period. Non-outright bids may also match un-like numbers of positions. In the context of an electricity forward contract exchange, an example non-outright bid may include a long position on a quantity of power generated over a first settlement period at four nodes and a corresponding short position on power delivered at three other nodes over the first settlement period.

Another example non-outright bid is a spread-of-spreads bid. A spread-of-spreads bid may a bid valuing a spread between a first spread and a second spread. For example, the first spread may be between contracts settling over two different commodities over a first time period. The second spread may be between contracts settling over the same two commodities over a second time period. Another example non-outright bid may be a non-contiguous multi-period bid. A first leg or legs of such a bid may settle on a first contract or contracts over a first settlement period and a second leg or legs may settle on the first contract over a second settlement period that is not contiguous to the first. Yet another example non-outright bid is a proportional bid. In a proportional bid, one or more legs may be based on the price of an underlying contract multiplied by a proportionality constant. An example proportional bid may be a locational electricity contract paired with a proportional amount of locational gas contracts with a proportionality constant equal to the conversion efficiency of a gas turbine generation plant. In this example, the awarded proportional bid may act as a direct financial hedge to the operating costs and revenues of a gas turbine generation plant.

According to various embodiments, the auction engine 118 may be configured to derive a position or combination of contract positions that are equivalent to the position represented by each participant bid. For example, positions in some contract types may be expressed synthetically in terms of other contracts. This may allow the auction engine 118 to match a bid or bid leg on one type of contract with a corresponding bid or bid legs on another type of contract. For example, as described below, an electricity loss contract may be expressed as a spread between an electricity price contract and an appropriate congestion contract. According to various embodiments, a participant need only bid for a position and need not specify a particular contract or contracts. Also, if the position of a participant's bid may be represented by more than one combination of contract positions, the auction engine 118 may be configured to substitute equivalent positions in order to derive an optimal solution.

At box 204, the trade engine 104 may receive participant constraints. For example, participant constraints may include collateral limits and trade limits. A collateral limit for some or all of the participants may be received from the clearing corporation 106 or other clearing party. A collateral limit, or margin parameter, may be a limit on the positions that a particular participant is permitted to hold based on the amount of collateral that the participant has posted or has available to post. According to various embodiments, awarded bids and other transactions may be novated by the clearing corporation 106, as described below. This makes the clearing corporation 106 the counter party to both sides of each transaction, causing the clearing corporation 106 to bear the risk of participant defaults. To mitigate this risk the clearing corporation 106 may require participants to back up their positions with collateral. The amount of collateral required for a given position (e.g., a collateral limit or margin) may be set for a participant 102 based on the risk of the participant's portfolio, the historical volatility of the portfolio, correlations among the contracts comprising the portfolio, and the risk tolerance of the clearing corporation 106 with respect to the participant 102. In one embodiment, the collateral limit for a given participant may be provided to the trade platform 104 by a general clearing member (GCM) responsible for clearing transactions for the participant 102 and may stay in effect until revoked or revised by the GCM.

A trading limit for a particular participant 102 may be used to constrain the trading activities of the participant 102. A trading limit may represent the maximum trading activity that a participant 102 may undertake in a single period (e.g., a day a month, etc.). The trading limit may be expressed, for example, as a number of trades or a volume. The trading limit for any given participant 102 may be set by the participant 102, by the trade platform 104 or by clearing corporation 106 or the GCM responsible for the participant 102.

According to various embodiments, the bids received from each participant 102 may be pre-screened, at box 206. Pre-screening a bid may comprise generating a list of unique contracts for which each participant 102 has submitted bids. For example, each outright bid may have one associated contract. Some non-outright bids, (e.g., those having multiple legs), may have more than one associated contract. Prescreening may also involve creating a pre-screening file for each participant 102. The pre-screening file may include any parameters that are necessary to calculate collateral requirements for various positions in associated contracts. Such parameters may include, for example, an initial margin for each contract and inter-commodity spread credits. An initial margin for a contract may represent an amount of collateral required for an outright position in the contract. An inter-commodity spread credit may represent reduction in collateral (e.g., a percentage) that is awarded for offsetting positions (e.g., long and short) in two separate but correlated contracts. The pre-screening file may typically include less than the entire set of parameters describing the market. This may allow the auction engine 118 to calculate the collateral required for a participant's positions without the need to process the full set of market parameters.

At step 208, the trade platform 104 (e.g., the auction engine 118) may perform the auction by matching corresponding bids within the batch. According to various embodiments, the matching may be co-optimized for outright bids and non-outright bids (e.g., any kind of offsetting positions may be matched). For example, each leg of a non-outright bid may be treated as an outright bid and may be matched with any offsetting position including, for example, an offsetting outright bid and/or an offsetting leg or combination of legs from other non-outright bids. Likewise an outright bid may be matched with an offsetting outright bid, or with any combination of non-outright bid legs. Also, according to various embodiments, contracts of different tenors or settlement periods may be matched. For example, a bid for a contract having a tenor longer than a pre-determined tenor may be expressed as a bid for an equivalent bundle of contracts having the pre-determined tenor. Such a bid may be matched with: other bids for the same bundled contract; some combination of offsetting bids for pre-determined tenor contracts; and/or some portion of a bid for other bundled contracts.

According to various embodiments, the set of bids to be considered for any given contract may include all outright bids for the contract as well as all legs of non-outright bids that can be expressed in terms of a position in all or a portion of the contract. In some embodiments, the auction engine 118 may be configured to avoid partially awarding a bid. For example, the auction engine 118 may not match any of the legs of a non-outright bid unless it is able to match all of the legs of the non-outright bid. In this way, participants may be able to construct bids for complex positions without assuming the risk that less than all of the position will be awarded.

Also, in various embodiments, the total awarded positions in each contract may be set equal to zero (e.g., the volume of matched or awarded long positions in any given contract may be equal the volume of awarded short positions). This may be referred to as a zero-capacity constraint.

Several examples of positions that may be matched are now provided. In a first example, a first participant may place an outright bid for a long position in 1000 cubic feet of natural gas at location A over a first settlement period. A second participant may place an outright bid for a short position in 1000 cubic feet of natural gas at location B over the same settlement period. A third participant may place a non-outright bid for a position in 1000 cubic feet from location A to location B over the same settlement period. The short leg of the non-outright bid (e.g., 1000 cubic feet at location A) may be matched with the first participant's bid, while the long leg of the non-outright bid (e.g., 1000 cubic feet at location B) may be matched with the second participant's bid. In another example, a first participant may make a non-outright bid for a long position in a commodity contract with a tenor of three months. Three other participants may bid for short positions in the commodity, with one short position corresponding to each of the three months covered by the first participant's bid. The first participant's bid may be matched with the bids of the three other participants.

According to various embodiments, the batch of bids may be matched to optimize an auction variable. For example, in some embodiments, the auction engine 118 may solve for the combination of bids that maximizes auction revenue. Auction revenue may be the total notional value of all awarded bids. Also, in some embodiments, the auction engine 118 may solve for the combination of bids that maximizes transaction volume, and therefore promotes liquidity. A combination of auction revenue and transaction volume may also be optimized.

At box 210, the auction engine 118 may create a preliminary awarded portfolio for each participant 102 based on the results of the matching at step 208. A preliminary awarded portfolio may represent all of a participant's bids that were successfully matched to other positions according to the constraints of the auction. At box 212, the auction engine 118 may determine whether any of the preliminary awarded portfolios violate the corresponding participant constraints. For example, a participant's preliminary awarded portfolio may violate a participant constraint if it causes the participant to take a position that is in excess of that participant's trade limit, or would require collateral in excess of the participant's collateral limit. The pre-screening file derived at box 206 may be utilized to streamline the process of determining the collateral required for the preliminary awarded portfolio.

For any preliminary awarded portfolios that violate participant constraints, the auction engine 118 may discard a subset of bids from the portfolio at step 214 such that the bids remaining in the portfolio do not exceed the participant constraint. If the participant has submitted bid priorities, then the bids given the lowest priority by the participant may be discarded first. According to various embodiments, if the participant has failed to provide bid priorities, then bids may be successively discarded in ascending order of positive impact on the participant's economic surplus, with the bid whose presence in the portfolio has the least positive (or most negative) impact discarded first until the participant constraints are met. After bids are discarded, the auction process may be repeated at box 208, generating new preliminary awarded portfolios for each participant. This process may continue iteratively until all awarded portfolios meet their corresponding participant constraints. According to various embodiments, the auction engine 118 may be programmed to optimize the matching of bids to meet participant constraints on the first iteration, making it unnecessary to recalculate the awarded portfolios multiple times.

At box 216, the auction engine 118 may set a price for each contract for which bids were entertained. Contracts having awarded bids, or awarded bids on equivalent positions, may be set to the price of the awarded bids. Not all contracts, however, may have awarded bids. Contracts without awarded bids may be priced according to any suitable manner. For example, if a contract has a lowest received short bid that exceeds the highest received long bid, the price may be set at the midpoint of the lowest short bid and the highest long bid. Also, some contracts may have no awarded positions despite having a highest long bid that exceeds the lowest short bid. For example, the optimal auction solution may not have included any possible transactions for these contracts. The price of such contracts may be set to the intersection of long and short bids (e.g., the intersection of supply and demand). Still other contracts may have received no bids. For these contracts, prices may be extrapolated from the clearing prices of other contracts in the auction, for example, based on historical price correlations. In various embodiments, a percent change in the price of a first contract or contracts in the current auction from the previous auction may be applied to other contracts which are highly correlated to the first contract or contracts. For example, given two highly correlated contracts A and B, if contract A increased in price by 5% in a current auction, while there were no bids for contract, B, then the price of contract B may be set to a value 5% higher than its previous prices.

At box 218, some or all of the un-awarded bids from the auction may be forwarded to a broker trading platform comprising the trade capture system 120. According to various embodiments, participants may choose whether their un-awarded bids are forwarded to brokers 110 or discarded. Authorized brokers 110 may access the trade platform 104 to view un-awarded bids, as well as any other non-auction bids submitted to a broker 110 or to the trade platform 103. Brokers 110 may then solicit counter-parties for the bids. If a counter party is found, the transaction may be forwarded to the trade capture system 120, which may facilitate the transaction. For example, the trade capture system 120 may verify that the broker 110 is authorized to transact on the trade platform 104; verify that the participant 102 is authorized to transact on the trade platform 104; and/or verify that the transaction would not violate a participant constraint, such as a collateral constraint or a trade limit. Provided that the transaction is properly authorized, it may be forwarded to the clearing corporation 106. It will be appreciated that the brokers 110 may also receive other bids outside of the auction process. For example, auctions may be held periodically (e.g., daily, weekly, monthly). Participants who desire a transaction between auctions may submit bids to one of the brokers 110. If a counter party is found, the transaction may proceed to the trade capture system 120 as described.

Referring back to FIG. 2, awarded bids may be cleared at step 220. According to various embodiments, the clearing corporation 106, or other clearing party, may act as a counterparty to all transactions. Through a process called novation, each trade between two participants may be split into two trades, whereby the clearing corporation 106 becomes the buyer to the selling participant and the seller to the buying participant.

In embodiments where this clearing arrangement is used, the clearing corporation 106 may assume most of the credit risk inherent in the transaction. To mitigate this risk, some clearing corporations 106 may require that all positions be settled on a periodic (e.g., daily) basis, regardless of the maturity of the underlying contracts. For example, if a participant has a long position in a first contract, and the closing price of the first contract falls by $10, the clearing corporation may transfer $10 from the participant's margin account to the clearing corporation 106 to cover the position. Likewise, the clearing corporation 106 may transfer $10 to the margin accounts of any participants holding long positions in the futures contract. The prices used to determine changes in value of various contracts may be, for example, the prices found at box 216 as described above.

According to various embodiments, the trading platform 104 may generate sufficient liquidity to allow it to handle auctions for large numbers of contracts. For example, as the number of contracts considered in an auction increases, the number of outright bids for each contract decreases, bringing about a corresponding decrease in liquidity. Utilizing the systems and methods described herein, may promote liquidity. For example, matching outright bids with a leg or legs of non-outright bids may generate more matched bids per outright bid. In addition, according to various embodiments, the number of allowed non-outright bid configurations may draw more participants to the market for arbitrage and speculation opportunities, further increasing liquidity. Accordingly, in the context of a forward commodities market, (e.g., a forward electricity market) the trading platform 104 may be able to support auctions on over one hundred thousand contracts. According to various embodiments, the trading platform 104 may be able to support auctions on more than a million contracts.

Figure 3:
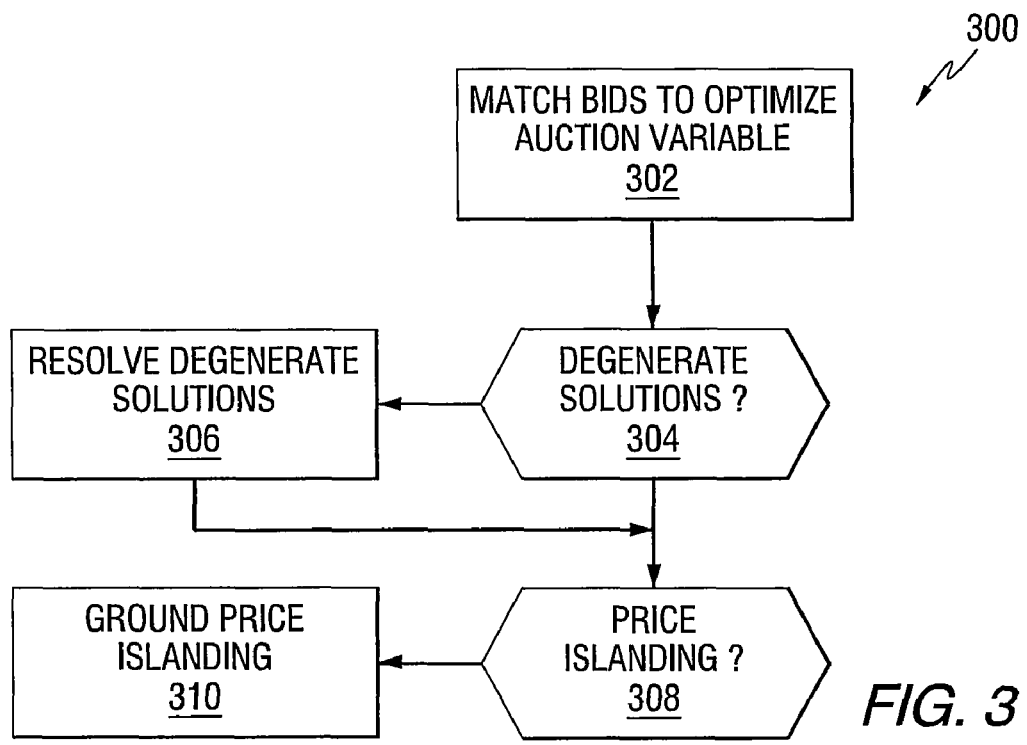
FIG. 3 illustrates one embodiment of a process flow that may be implemented by the architecture of FIG. 1 to match and award bids selected from a batch.

FIG. 3 illustrates one embodiment of a process flow 300 that may be implemented by the auction engine 118 of the trading platform 104 to match and award bids selected from a batch. At box 302, the auction engine 118 may match bids from the batch to optimize the auction variable or variables (e.g., auction revenue and/or auction volume), for example, as described above. According to various embodiments, the auction engine 118 may match bids to maximize auction volume, for example, as expressed by Equation (1):

$$\sum_n \sum_b |AwardP_{n,b} \times AwardQ_{n,b}| \qquad (1)$$

In Equation (1), n is the set of all contracts in the auction; b is the set of all bids that include a position in a contract n (including outright and non-outright bids); $AwardP_{n,b}$ is the auction price for the contract n, and $AwardQ_{n,b}$ is the number of contracts awarded for contract n from bid b.

The auction engine 118 may maximize Equation (1) subject to various constraints. For example, the sum of awarded positions in a contract may be set equal to zero (e.g., a zero-capacity constraint):

$$\sum_b AwardQ_{n,b} = 0 \qquad (2)$$

Also, the maximum price for a contract in an awarded bid may be set between zero and a maximum bid price. For example, Equation (3) expresses this condition for long bids and bid legs:

$$0 \leq AwardQ_{n,b} \leq BidQ_{n,b} \qquad (3)$$

In Equation (3), $BidQ_{n,b}$ may be the maximum bid quantity. Similarly, Equation (4) expresses this condition for short bids and bid legs:

$$0 \geq AwardQ_{n,b} \geq BidQ_{n,b} \qquad (4)$$

In addition to these conditions, the price of each awarded bid may be less than or equal to the highest bid prices. Equation (5) expresses this condition for outright bids:

$$AwardP_{n,b} \leq BidP_{n,b} \qquad (5)$$

In Equation (5), $BidP_{n,b}$ may be the maximum bid price. Similarly, Equation (6) expresses this condition for non-outright bids having multiple legs:

$$AwardTP_b \leq BidTP_b \qquad (6)$$

Here, $AwardTP_b$ may be the sum of the bid prices for all bids b on the contract n, as set forth in Equation (7):

$$AwardTP_b = \sum_n BidP_{n,b} \qquad (7)$$

Any suitable optimization algorithm may be used including, for example, a simplex algorithm. For example, a CPLEX optimization engine may be utilized. According to various embodiments, additional constraints may require that the matched bids meet all participant constraints.

Figure 4:
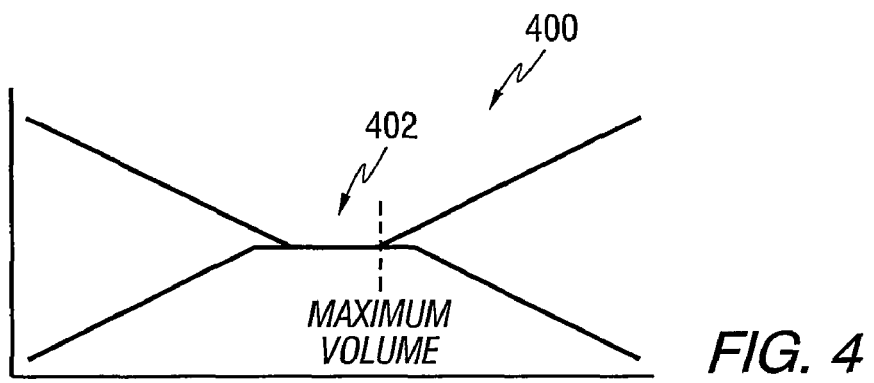
FIG. 4 illustrates one embodiment of a graph illustrating a degenerate volume solution for matching bids.
Figure 5:
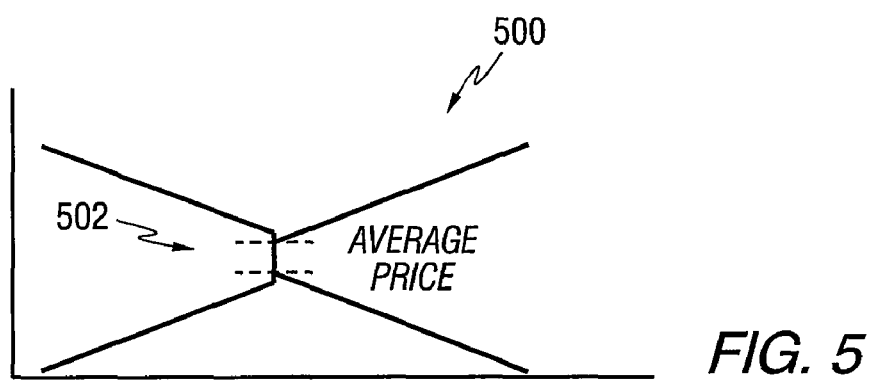
FIG. 5 illustrates one embodiment of a graph illustrating a degenerate price solution for matching bids.

At decision 304, the auction engine 118 may determine whether the optimization algorithm has resulted in any degenerate solutions. A degenerate solution may occur when there is more than one auction solution where a given auction variable is optimized. For example, FIG. 4 illustrates one embodiment of a graph 400 illustrating a degenerate volume solution for matching bids. As shown in the graph 400, an optimal cleared volume may be achieved anywhere along a horizontal demand and supply curve portion 402. Also, FIG. 5 illustrates one embodiment of a graph 500 illustrating a degenerate price solution for matching bids. In the example shown by the graph 500, the optimal price may occur anywhere along a vertical portion 502 of the demand and supply curve.

Referring back to FIG. 3, any degenerate solutions may be resolved at box 306. For example, if a degenerate volume solutions exists, the auction engine 118 may select the solution having the maximal optimized cleared volume and/or auction revenue. Also, for example, if a degenerate price solution exists, the auction engine 118 may average the high and low values of the optimized values for price to select the price value to be used.

At decision 308, the auction engine 118 may determine whether the optimization algorithm has resulted in any price islanding. Price islanding may occur when a cleared/matched set of non-outright bids for a given contract or contracts are not connected to the other contracts/bids by an outright bid or another constrained bid (e.g., a bid that depends on an outright position). This may result in a series of shadow prices for the islanded contracts that resolve to a range of possible prices. Any price islanding may be grounded at box 310, for example, by using previous-auction period (e.g., previous day, week, etc.) prices bound by the range of valid shadow prices for each contract.

The architecture 100 and trading platform 104 described above may be implemented in any market or exchange dealing in financially settled contracts. According to various embodiments, however, the architecture 100 may be implemented in a forward commodity market having a network of locationally defined, financially settled contracts. A locationally defined contract may be a contract whose underlying value is a commodity or other value described by a combination of commodity or value type (e.g., natural gas, crude oil, congestion, loss, etc.) and location. The dependence on location may allow locationally defined contracts to reflect variations in prices at different locations that arise because of constraints on the flow or transport of the commodity. For example, the price of natural gas may not be the same at all locations, at least in part because the layout and capacity of pipelines may limit the rate at which natural gas can be transferred between locations.

Participants in the physical commodities markets are exposed to risk from the volatility in price of the physical commodities at specific locations, and potentially from the volatility in price differentials between locations. These participants may utilize a forward commodity market implementing the architecture 100 to hedge this risk. Because the architecture 100 may support a wide variety of non-outright bids varying over different commodities, settlement periods and locations, participants may be able to better tailor hedges to the risk of their physical positions. Also, participants with or without physical positions may be better able to pursue complex trading strategies and arbitrage opportunities. The increased liquidity brought about by the auction methods described and by speculative and arbitrage activity, may make it easier for physical position holders to obtain a desired hedge.

In another example embodiment, the architecture 100 and trading platform 104 may be implemented in an electricity forward market. An electricity forward market may be a financial forward market whose contracts settle on the electricity-related values at various locations or nodes in physical spot markets. For example, an electricity price contract may settle on an average electricity price at a location on the corresponding network (e.g., a region, hub or node) either during on-peak or off-peak hours over a specified settlement period (e.g., 1 day, 1 week, 2 months, 1 quarter, 1 year, etc.). A congestion contract may settle on the congestion at a given node. A loss contract may settle on the transmission loss between two nodes.

According to various embodiments, an electricity forward market implementing the architecture 100 may support nodal electricity forward contracts. Nodal electricity forward contracts may include contracts that settle on an average electricity price, congestion or loss at a node or nodes over a specified settlement period (e.g., during on-peak or off-peak hours). This may require the market to support a large number of contracts, and address associated liquidity challenges. For example, the number of nodes considered by an electricity forward market is limited only by the number of node locations on the corresponding spot market/grid. Some such grids may include several thousand nodes. Because each node may be the basis of multiple contracts (e.g., contracts for different classes, time periods, etc.), the total number of contracts traded in an electricity forward market may be quite large.

Figure 6:
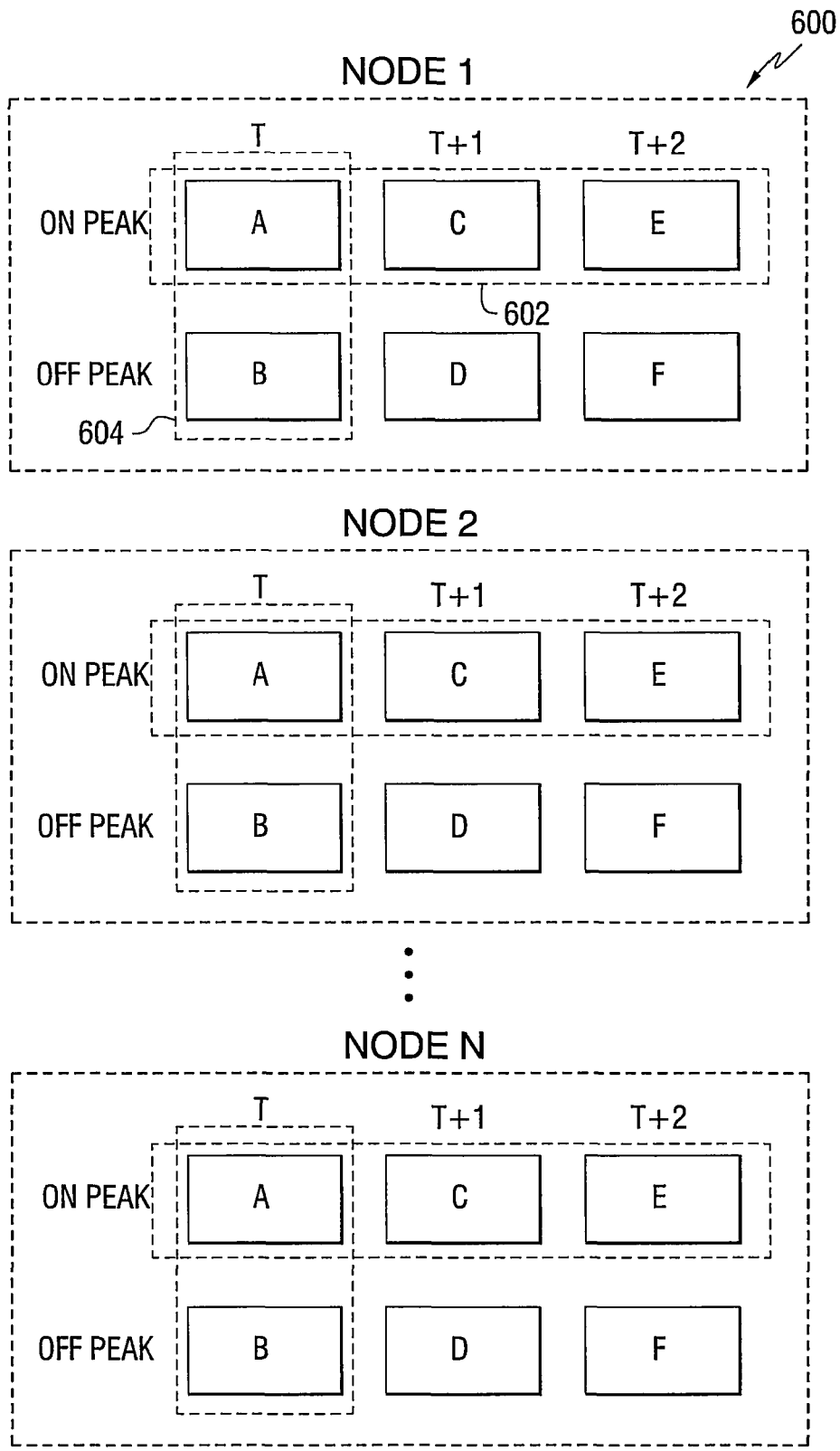
FIG. 6 illustrates one embodiment of a diagram showing example electricity forward contracts and various available bids that may be supported by the architecture of FIG. 1.

FIG. 6 illustrates one embodiment of a diagram 600 showing example electricity forward contracts and various available bids that may be supported by the architecture 100. The example forward electricity contracts may be, for example, electricity forward contracts settling on the price of electricity at a node, or congestion contracts. The diagram 600 shows example contracts that settle at one of the nodes 1, 2 . . . N. According to various embodiments, the number of nodes, N, may match the number of nodes in a corresponding grid. For each node, the diagram 600 illustrates six contracts, A, B, C, D, E, F over three time periods, T, T+1 and T+2. T may be any period of time including, for example, a day, a month, etc. Although only three time periods are illustrated, in practice, bids may be accepted for an arbitrary amount of time into the future. For example, according to various embodiments, the architecture 100 may accept bids for contracts that settle up to seventy-two months in the future. As shown in the diagram 600, the contracts may be divided into classes based on whether they settle during off-peak hours (B, D, F) or during on-peak hours (A, C, E). Contracts settling on other underlying values may also be divided into classes based on classifications of the underlying value.

The architecture 100 may support various outright and non-outright bids based on any combination of electricity forward contracts, such as those illustrated by the diagram 600. For example, for the forward electricity contracts shown in the diagram 600, three dimensions are shown: (i) a class dimension (e.g., on-peak versus off-peak); (ii) a settlement period dimension (e.g., T, T+1, T+2 etc.); and (iii) a locational dimension (e.g., Nodes 1, 2 . . . N). Other market types may include more or fewer dimensions.

Allowable bids may vary across any dimensions. For example, a single period bid may be a straight outright bid for a long or short position in any of the contracts shown. A multi-period bid may be a non-outright bid including legs for contracts at a single location over multiple time periods. For example, box 602 illustrates a multi-period bid for on-peak contracts 1A, 1C and 1E spanning the settlement periods T, T+1 and T+2. Multi-class bids may include legs for contracts at a single location across multiple classes. For example, Box 604 illustrates a multi-class bid for contracts settling at Node 1 over settlement period T across the on-peak and off-peak classes (e.g., 1A and 1B). A multi-period, multi-class bid may include legs for contracts at a single location across multiple classes and multiple settlement periods. An example of such a bid may include legs for contracts 1A, 1B, 1C, 1D, 1E and 1F.

Various non-outright bids may include matched or unmatched positions varying across the class, settlement period and locational dimensions. For example, some non-outright bids may comprise a first leg or legs taking a short position in a first contract or contracts and a second leg or legs taking a long position in a second contract or contracts. The number of short and long legs may, but need not match.

Also, a locational non-outright bid may include legs taking positions across two locations (e.g., nodes) for any settlement period or class. An example locational non-outright bid may include legs for contracts 1A and 2A. A temporal non-outright bid may include legs taking positions across two settlement periods, which may or may not be contiguous. An example temporal non-outright bid may include a leg for a long position in contract 1A and a leg for a short position in contract 1C. A locational, temporal non-outright bid may comprise legs taking positions across two locations and two settlement periods. An example locational, temporal bid may comprise a long leg on contract 1A and a short leg on contract 2C. Other example non-outright bids may include variations of the class dimension including, for example, inter-class bids, locational inter-class bids, temporal inter-class bids, locational, temporal inter-class bids, etc.

Bids may also vary across different types of underlying values (e.g., electricity price, congestion, loss, etc.). According to various embodiments, positions in one contract type may be expressed synthetically in terms of positions in other contract types. For example, a loss position may be expressed as a spread between a price position and a congestion position. This may allow various embodiments of the trading platform 104 to accept and award bids on certain contract types, without actually having the underlying contract available. Also, this may allow bids for positions in one type of contract (or combination of contracts) to be matched with bids for positions in other types of contracts (or combination of contracts).

Figure 7:
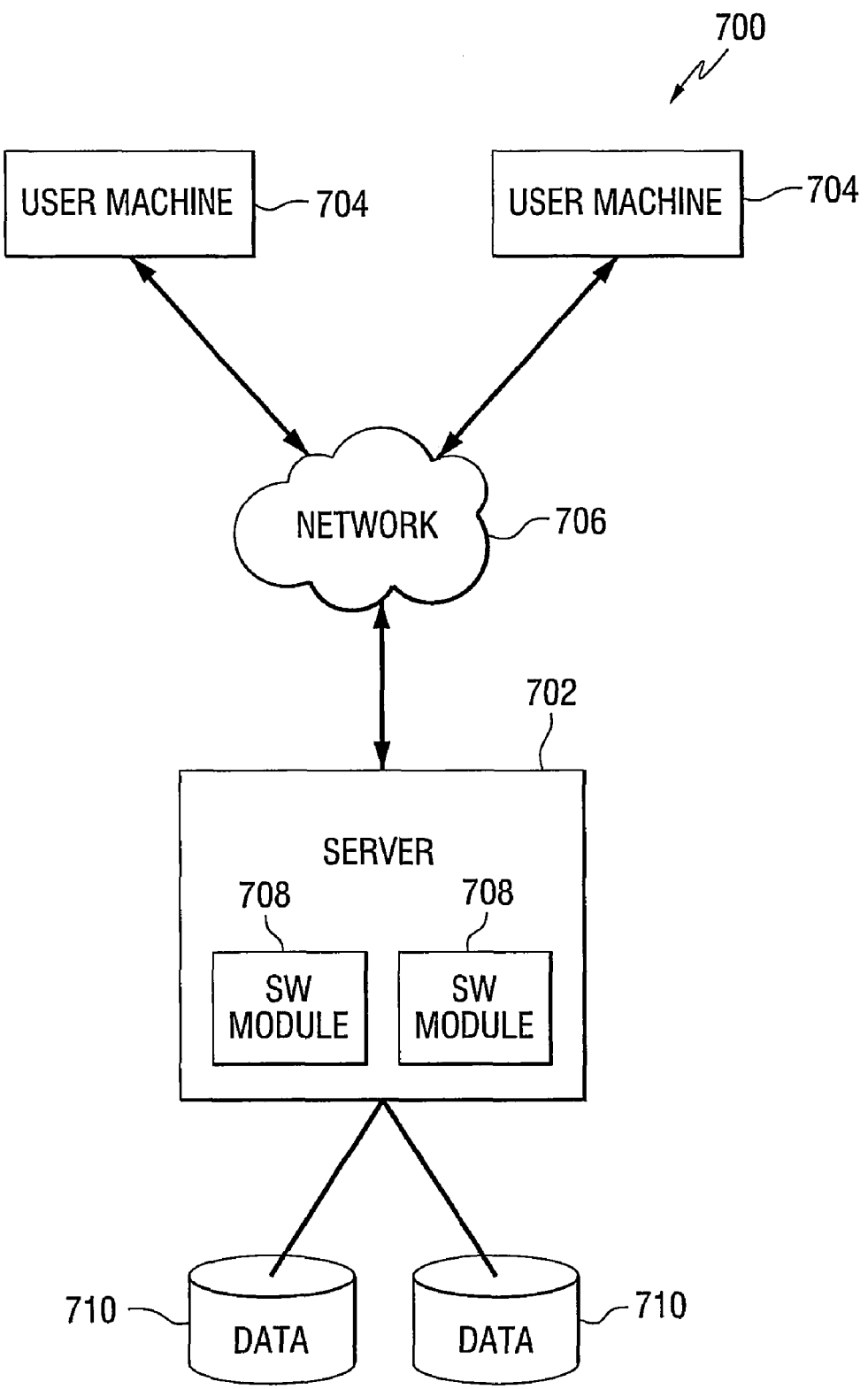
FIG. 7 illustrates one embodiment of a computer system for implementing the architecture of FIG. 1.

FIG. 7 illustrates one embodiment of a computer system 700 for implementing the architecture 100. The system 700 may include one or more servers 702. The one or more servers 702 may include a processor or processors configured to execute one or more software modules 708. Each software module 708 may implement all or a part of a functional component of the architecture. For example, one of the software modules 708 may implement all or a portion of auction engine 118 and/or the trade capture system 120. Data necessary or useful for implementing the architecture 100 may be stored at one or more databases 710. Also, one or more user machines 704 may be in communication with the server 702 via a network 706. The network 706 may be any kind of suitable wired or wireless network. User machines 704 may be used, for example, by participants 102, brokers 110, the clearing corporation 106 and/or clearing members 108 to access the functionality implemented by the server 702. According to various embodiments one or more of the participants 102, brokers 110, clearing corporation 106 and/or clearing members 108 may implement an automated interface to the sever 702, allowing bids to be submitted and trades to be executed without human intervention.

It is to be understood that the figures and descriptions of the present invention have been simplified to illustrate elements that are relevant for a clear understanding of the present invention, while eliminating, for purposes of clarity, other elements, such as, for example, some specific tasks of the non-execution service provider units described above, etc. Those of ordinary skill in the art will recognize that these and other elements may be desirable. However, because such elements are well known in the art and because they do not facilitate a better understanding of the present invention, a discussion of such elements is not provided herein.

As used herein, a "computer," "computer system" or "programmable device" may be, for example and without limitation, either alone or in combination, a personal computer (PC), server-based computer, main frame, server, microcomputer, minicomputer, laptop, personal data assistant (PDA), cellular phone, pager, processor, including wireless and/or wireline varieties thereof, and/or any other computerized device capable of configuration for processing data for standalone application and/or over a networked medium or media. Computers, computer systems and programmable devices disclosed herein may include operatively associated memory for storing certain software applications used in obtaining, processing, storing and/or communicating data. It can be appreciated that such memory can be internal, external, remote or local with respect to its operatively associated computer or computer system. Memory may also include any means for storing software or other instructions including, for example and without limitation, a hard disk, an optical disk, floppy disk, ROM (read only memory), RAM (random access memory), PROM (programmable ROM), EEPROM (extended erasable PROM), and/or other like computer-readable media.

Various modules and components of the architecture 100 and/or the system 700 may be implemented as software code to be executed by a processor(s) of any computer system using any type of suitable computer instruction type. The software code may be stored as a series of instructions or commands on a computer readable medium. The term "computer-readable medium" as used herein may include, for example, magnetic and optical memory devices such as diskettes, compact discs of both read-only and writeable varieties, optical disk drives, and hard disk drives. A computer-readable medium may also include memory storage that can be physical, virtual, permanent, temporary, semi-permanent and/or semi-temporary.

We claim:

1. A method using a programmable device for conducting an auction for a plurality of financially settled contracts, the method comprising:

receiving, by the programmable device, a plurality of first participant bids from a first participant;

receiving, by the programmable device, a plurality of second participant bids from a second participant; and simultaneously matching a batch of bids by the programmable device to create a plurality of awarded bids, wherein the batch of bids comprises the plurality of bids from all the participants, wherein each bid of the batch of bids relates to at least a portion of the plurality of financially settled contracts, and wherein the matching comprises matching at least one leg of at least one non-outright bid, wherein a non-outright bid is a bid for a position that does not have a one-to-one correlation to a contract, and has at least one of: (i) multiple legs, where each leg represents a long or short position in a particular contract, and, (ii) one or more legs each representing a single position that is less than all of a contract;

wherein the non-outright bid comprises a price and an indication of each contract corresponding to a leg of the non-outright bid, the indication comprising, a quantity, a settlement period, and a contract code, and an indication of which leg or legs are short and which leg or legs are long;

wherein the matching does not match any of the legs of a non-outright bid unless it matches all of the legs of the non-outright bid, such that a participant making a non-outright bid has no risk that less than all of the non-outright bid will be awarded; and wherein the plurality of awarded bids maximizes at least one auction variable selected from the group consisting of auction revenue and transaction volume.

2. The method of claim 1, further comprising:

receiving by the computer a first participant constraint;

generating by the computer a preliminary awarded portfolio for the first participant, wherein the preliminary awarded portfolio comprises at least one awarded bid selected from the plurality of first participant bids; and if the preliminary awarded portfolio does not meet the first participant constraint, discarding a portion of the plurality of first participant bids.

3. The method of claim 2, wherein the portion of the plurality of bids is selected considering at least one factor selected from the group consisting of a bid priority received from the first participant; and the first participant's economic surplus.

4. The method of claim 2, wherein the first participant constraint is at least one constraint selected from the group consisting of a trade limit and a collateral limit.

5. The method of claim 1, wherein the plurality of awarded bids comprises an equal volume of long bids and short bids for each of the plurality of financially settled contracts with at least one set of awarded bids.

6. The method of claim 1, wherein matching the batch of bids comprises maximizing:

$$\sum_n \sum_b |AwardP_{n,b} \times AwardQ_{n,b}|.$$

7. The method of claim 6, wherein the maximizing comprises maximizing according to the constraint that $$\sum_b AwardQ_{n,b} = 0.$$

8. The method of claim 6, wherein the maximizing comprises maximizing according to the constraints that:

$0 \leq AwardQ_{n,b} \leq BidQ_{n,b};$ $0 \geq AwardQ_{n,b} \geq BidQ_{n,b};$ $AwardP_{n,b} \leq BidP_{n,b};$ and $AwardTP_b \leq BidTP_b.$ 9. The method of claim 1, the steps further comprising deriving a price for all of the plurality of financially settled contracts.

10. The method of claim 1, further comprising deriving a price for a contract selected from the plurality of financially settled contracts, wherein the contract has no awarded bids in the plurality of awarded bids.

11. The method of claim 10, wherein deriving the price comprises setting the price to a mid-point between a lowest short bid and a highest long bid for the contract selected from the batch of bids.

12. The method of claim 10, wherein deriving the price comprises modifying a price for the contract from a previous auction by an amount proportional to a price change of a second contract correlated to the first contract.

13. The method of claim 1, further comprising publishing at least a portion of un-awarded bids from the batch of bids to at least one broker.

14. The method of claim 1, wherein the matching comprises resolving at least one degenerate solution selected from the group consisting of a degenerate price solution and a degenerate volume solution.

15. The method of claim 1, wherein the plurality of financially settled contracts each settle on the price of a commodity type at a location over a settlement period.

16. The method of claim 1, wherein the plurality of contracts comprises at least one contract selected from the group consisting of an electricity contract, a congestion contract and a loss contract.

17. The method of claim 1, wherein the at least one non-outright bid comprises a non-outright bid comprising a first leg and a second leg, and wherein the first leg and the second leg relate to underlying contracts settling on the price of different underlying values at different locations over different settlement periods.

18. The method of claim 1, wherein the batch of bids comprises at least one bid type selected from the group consisting of: a spread bid, a strip bid, a spread of spreads bid, a single period bid, a multi-period bid, a non-contiguous multi-period bid, a proportional bid, a multi-class bid, a multi-period/multi-class bid, a locational bid, a temporal bid, a locational/temporal bid.

19. The method of claim 1, wherein the plurality of financially settled contracts comprises at least one contract selected from the group consisting of an oil contract, a coal contract, a natural gas contract, an electricity contract, a weather contract, a weather-related events contract, a commodities contract, a passenger contract; and a freight contract.

20. The method of claim 1, wherein the matching further comprises matching at least one bid with a synthetic equivalent.

21. The method of claim 1, wherein the matching further comprises matching each leg of a non-outright bid with a combination of legs from other non-outright bids.

22. The method of claim 1, wherein the bids from all the participants are received over a predetermined bid submission period.

23. The method of claim 1, further comprising:
receiving matched bids from a broker;
verifying that the broker is authorized to transact on the trade platform; and
verifying that completing a transaction for the matched bids would not violate a constraint of participants making the matched bids.

24. The method of claim 1, further comprising sending a portion of the batch of bids that are unmatched to at least one broker.

25. The method of claim 1, further comprising:
receiving bids from at least a portion of the plurality of participants;
forwarding the bids to an auction engine;
sending awarded bids to a clearing corporation; and
receiving participant constraints from the clearing corporation.

26. The method of claim 1, wherein the batch of bids comprises at least one bid selected from the group consisting of: a spread bid, a strip bid, a spread of spreads bid, a single period bid, a multi-period bid, a non-contiguous multi-period bid, a proportional bid, a multi-class bid, a multi-period/multi-class bid, a locational bid, a temporal bid, a locational/temporal bid.

27. The method of claim 1, wherein the batch of bids comprises at least two bids that differ across a class dimension, a locational dimension and a settlement period dimension.

28. A method using a programmable device for conducting an auction for a plurality of financially settled forward electricity contracts corresponding to a first spot market, the method comprising:
receiving, by the programmable device, a plurality of first participant bids from a first participant;
receiving, by the programmable device, a plurality of second participant bids from a second participant; and
simultaneously matching a batch of bids by the programmable device to create a plurality of awarded bids,
wherein the batch of bids comprises the plurality of bids from all the participants,
wherein each bid of the batch of bids relates to at least a portion of the plurality of financially settled contracts,
wherein the matching comprises matching at least one leg of at least one non-outright bid,
wherein the plurality of financially settled forward electricity contracts comprises a plurality of nodal contracts,
wherein a non-outright bid is a bid for a position that does not have a one-to-one correlation to a contract, and has at least one of: (i) multiple legs, where each leg represents a long or short position in a particular contract, and, (ii) one or more legs each representing a single position that is less than all of a contract;
wherein the non-outright bid comprises a price and an indication of each contract corresponding to a leg of the non-outright bid, the indication comprising, a quantity, a settlement period, and a contract code, and an indication of which leg or legs are short and which leg or legs are long, and
wherein the matching does not match any of the legs of a non-outright bid unless it matches all of the legs of the non-outright bid, such that a participant making a non-outright bid has no risk that less than all of the non-outright bid will be awarded
wherein the plurality of awarded bids maximizes at least one auction variable selected from the group consisting of auction revenue and transaction volume.

29. The method of claim 28, wherein the plurality of nodal contracts each settle on a price of electricity at a node over a settlement period.

30. The method of claim 28, wherein the at least one non-outright bid comprises a non-outright bid comprising a first leg and a second leg, and wherein the first leg and the second leg relate to underlying contracts settling at different nodes and over different settlement periods.

31. The method of claim 28, wherein the plurality of financially settled forward electricity contracts comprises contracts that settle at substantially all of the nodes of the spot market.

32. The method of claim 28, wherein the plurality of financially settled forward electricity contracts comprises at least one hundred thousand contracts.

33. The method of claim 28, wherein the plurality of financially settled forward electricity contracts comprise at least one price contract and at least one congestion contract.

34. The method of claim 28, wherein the plurality of financially settled forward electricity contracts comprise at least one loss contract.

35. The method of claim 28, wherein the plurality of financially settled forward electricity contracts comprises contracts that settle at substantially all of the nodes of the spot market.

36. The method of claim 28, further comprising:
receiving by the computer a first participant constraint;
generating by the computer a preliminary awarded portfolio for the first participant, wherein the preliminary awarded portfolio comprises at least one awarded bid selected from the plurality of first participant bids; and
if the preliminary awarded portfolio does not meet the first participant constraint, discarding a portion of the plurality of first participant bids.

37. The method of claim 36, wherein the portion of the plurality of bids is selected considering at least one factor selected from the group consisting of a bid priority received from the first participant; and the first participant's economic surplus.

38. The method of claim 36, wherein the first participant constraint is at least one constraint selected from the group consisting of a trade limit and a collateral limit.

39. The method of claim 28, wherein the plurality of awarded bids comprises an equal volume of long bids and short bids for each of the plurality of financially settled forward electricity contracts with at least one set of awarded bids.

40. The method of claim 28, wherein matching the batch of bids comprises maximizing:

$$\sum_n \sum_b |AwardP_{n,b} \times AwardQ_{n,b}|.$$

41. The method of claim 40, wherein the maximizing comprises maximizing according to the constraint that $$\sum_b AwardQ_{n,b} = 0.$$

42. The method of claim 40, wherein the maximizing comprises maximizing according to the constraints that:

$0 \leq AwardQ_{n,b} \leq BidQ_{n,b}$;

$0 \geq AwardQ_{n,b} \geq BidQ_{n,b}$;

$AwardP_{n,b} \leq BidP_{n,b}$; and $AwardTP_b \leq BidTP_b$.

43. The method of claim 28, the steps further comprising deriving a price for all of the plurality of financially settled forward electricity contracts.

44. The method of claim 28, further comprising deriving a price for a contract selected from the plurality of financially settled forward electricity contracts, wherein the contract has no awarded bids in the plurality of awarded bids.

45. The method of claim 44, wherein deriving the price comprises setting the price to a mid-point between a lowest short bid and a highest long bid for the contract selected from the batch of bids.

46. The method of claim 44, wherein deriving the price comprises modifying a price for the contract from a previous auction by an amount proportional to a price change of a second contract correlated to the first contract.

47. The method of claim 28, further comprising publishing at least a portion of un-awarded bids from the batch of bids to at least one broker.

48. The method of claim 28, wherein the matching comprises resolving at least one degenerate solution selected from the group consisting of a degenerate price solution and a degenerate volume solution.

49. The method of claim 28, wherein the plurality of contracts comprises at least one contract selected from the group consisting of an electricity contract, a congestion contract and a loss contract.

50. The method of claim 28, wherein the at least one non-outright bid comprises a non-outright bid comprising a first leg and a second leg, and wherein the first leg and the second leg relate to underlying contracts settling on the price of different underlying values at different locations over different settlement periods.

51. The method of claim 28, wherein the batch of bids comprises at least one bid type selected from the group consisting of: a spread bid, a strip bid, a spread of spreads bid, a single period bid, a multi-period bid, a non-contiguous multi-period bid, a proportional bid, a multi-class bid, a multi-period/multi-class bid, a locational bid, a temporal bid, a locational/temporal bid.

52. The method of claim 28, wherein the matching further comprises matching at least one bid with a synthetic equivalent.

53. The method of claim 28, wherein the matching further comprises matching each leg of a non-outright bid with a combination of legs from other non-outright bids.

54. The method of claim 28, wherein the bids from all the participants are received over a predetermined bid submission period.

55. The method of claim 28, further comprising:
receiving matched bids from a broker;
verifying that the broker is authorized to transact on the trade platform; and
verifying that completing a transaction for the matched bids would not violate a constraint of participants making the matched bids.

56. The method of claim 28, further comprising sending a portion of the batch of bids that are unmatched to at least one broker.

57. The method of claim 28, further comprising:
receiving bids from at least a portion of the plurality of participants;
forwarding the bids to an auction engine;
sending awarded bids to a clearing corporation; and
receiving participant constraints from the clearing corporation.

58. The method of claim 28, wherein the batch of bids comprises at least one bid selected from the group consisting of: a spread bid, a strip bid, a spread of spreads bid, a single period bid, a multi-period bid, a non-contiguous multi-period bid, a proportional bid, a multi-class bid, a multi-period/multi-class bid, a locational bid, a temporal bid, a locational/temporal bid.

59. The method of claim 28, wherein the batch of bids comprises at least two bids that differ across a class dimension, a locational dimension and a settlement period dimension.

* * * * *